United States Patent
Shaffer et al.

(10) Patent No.: US 11,816,688 B2
(45) Date of Patent: Nov. 14, 2023

(54) PERSONALIZED CUSTOMER SURVEYS

(71) Applicant: Avaya Inc., Basking Ridge, NJ (US)

(72) Inventors: Shmuel Shaffer, Palo Alto, CA (US); James Hickey, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 562 days.

(21) Appl. No.: 14/245,855

(22) Filed: Apr. 4, 2014

(65) Prior Publication Data

US 2015/0287062 A1    Oct. 8, 2015

(51) Int. Cl.
*G06Q 30/0203*   (2023.01)

(52) U.S. Cl.
CPC ................ *G06Q 30/0203* (2013.01)

(58) Field of Classification Search
None
See application file for complete search history.

(56) References Cited

U.S. PATENT DOCUMENTS

| | | | | |
|---|---|---|---|---|
| 5,943,416 A * | 8/1999 | Gisby | ..................... | H04M 3/51 379/197 |
| 6,574,621 B1 * | 6/2003 | Lautzenheiser | .......... | G06N 5/00 707/999.009 |
| 6,594,638 B1 * | 7/2003 | Feldman | ............ | G06Q 30/0239 705/14.39 |
| 7,000,019 B2 * | 2/2006 | Low | ....................... | G06Q 20/40 455/2.01 |
| 7,415,417 B2 * | 8/2008 | Boyer | .................. | G06Q 30/016 705/346 |
| 8,108,237 B2 * | 1/2012 | Bourne | ............ | G06Q 10/06311 705/7.13 |
| 8,634,534 B1 * | 1/2014 | Brandt | ................ | H04M 7/0057 370/217 |
| 8,885,812 B2 * | 11/2014 | Margulies | ................ | 379/265.02 |
| 9,092,799 B2 * | 7/2015 | Simpson | ............ | G06Q 30/0203 |
| 9,241,014 B2 * | 1/2016 | Jayapalan | ............... | H04M 3/42 |
| 2001/0037206 A1 * | 11/2001 | Falk | ................... | G06Q 30/0203 705/7.32 |

(Continued)

FOREIGN PATENT DOCUMENTS

| | | | | |
|---|---|---|---|---|
| WO | 1999041891 | | 8/1999 | |
| WO | 2012174659 | | 12/2012 | |
| WO | WO-2013041121 A1 * | 3/2013 | ........... | G06F 3/0481 |

OTHER PUBLICATIONS

Verint. "Post-Call Surveys." http://www.verint.com/solutions/enterprise-workforce-optimization/products/enterprise-feedback-management/post-call-surveys/index. 1 pg.

(Continued)

*Primary Examiner* — Romain Jeanty
(74) *Attorney, Agent, or Firm* — Sheridan Ross P.C.

(57) ABSTRACT

In order to provide a survey that reflects details of a communication session between two parties, content of an established communication session between the parties is monitored. One or more topics in the content of the communication session are identified. For example, a voice communication between a customer and a call center agent can be monitored to identify a specific topic, such as a discussion about car insurance. Based on the identified topic, a survey is generated by incorporating the topic into the survey. For example, the survey can include a question regarding the customer's car insurance of his four wheel drive SUV, which was discussed during the call. The survey is then presented to or sent to a party of the communication session.

20 Claims, 7 Drawing Sheets

(56) References Cited

U.S. PATENT DOCUMENTS

| | | | | |
|---|---|---|---|---|
| 2002/0052774 A1* | 5/2002 | Parker | ............... | G06Q 30/02 |
| | | | | 705/7.32 |
| 2002/0184041 A1* | 12/2002 | Muller | ............... | G06Q 30/0203 |
| | | | | 705/7.32 |
| 2003/0182135 A1* | 9/2003 | Sone | ............... | G06Q 30/02 |
| | | | | 705/304 |
| 2004/0249650 A1* | 12/2004 | Freedman | ............... | G06Q 30/02 |
| | | | | 705/7.29 |
| 2008/0021762 A1* | 1/2008 | Coon | ............... | G06Q 10/06 |
| | | | | 705/7.32 |
| 2009/0216610 A1* | 8/2009 | Chorny | ............... | G06Q 30/00 |
| | | | | 705/7.32 |
| 2010/0042468 A1* | 2/2010 | Doan | ............... | G06Q 10/06 |
| | | | | 705/7.32 |
| 2011/0153387 A1* | 6/2011 | Ma | ............... | G06Q 10/10 |
| | | | | 705/7.32 |
| 2011/0206198 A1* | 8/2011 | Freedman | ............... | G06Q 30/06 |
| | | | | 379/265.03 |
| 2014/0143157 A1* | 5/2014 | Jeffs | ............... | G06Q 30/016 |
| | | | | 705/304 |
| 2014/0278781 A1* | 9/2014 | Liu | ............... | G06Q 30/0203 |
| | | | | 705/7.32 |
| 2014/0337098 A1* | 11/2014 | Ganesh | ............... | G06Q 30/0203 |
| | | | | 705/7.32 |

OTHER PUBLICATIONS

"Real-Time Customer Feedback." Nice, http://www.nice.com/real-time-customer-feedback. 1 pg.

\* cited by examiner

PERSONALIZED CUSTOMER SURVEYS

TECHNICAL FIELD

The systems and methods disclosed herein relate to the generation of customer surveys and in particular to the generation of customer surveys based on monitoring content of a communication session.

BACKGROUND

Today, one way Contact Centers seek customer feedback is by utilizing an end-of-call survey application. At the end of the call, the customer is given the opportunity to provide feedback by being transferred to a survey application. A customer may take the survey by using an Interactive Voice Response (IVR) system, or a specialized survey application, to provide answers to predefined questions. Alternatively, the customer can be sent a link to a survey on a web page that contains the same predefined questions. In each case, the survey that is given to each customer is the same survey, but presented in two different media types.

Some surveys can support dynamic branching where the answer to one question is used to determine which among a set of predefined questions are presented next to the customer. This type of survey does provide some ability to customize the survey from one customer to the next, unless each customer answers each survey question in the same way.

However, these solutions each have significant shortcomings. Most notably, current customer surveys have to be generically developed. Even in the scenario of the dynamic branching survey, the rules defining how one question can branch to other questions are still generic to every dynamic branching survey. Because the surveys are generic, the feedback provided by the customer may not capture key information needed to make improvements in the Contact Center. In many cases, the customer may not complete the survey because the questions do not relate to what actually took place in the call.

SUMMARY

Systems and methods are provided to solve these and other problems and disadvantages of the prior art. To provide a survey that reflects details of a communication session between two parties, content of an established communication session between the parties is monitored. One or more topics in the content of the communication session are identified. For example, a voice communication session between a customer and a call center agent can be monitored to identify a specific topic, such as a discussion about car insurance. Based on the identified topic, a survey is generated by incorporating the topic into the survey. For example, the survey can include a question regarding the customer's car insurance of his four wheel drive SUV, which was discussed during the call. The survey is then presented to or sent to a party of the communication session.

In another embodiment, content of a communication session may be monitored based on a transfer of the communication session to another party.

In another embodiment, content of a communication session may be monitored based on conferencing the communication session.

In another embodiment, content of a multi-user communication session can be monitored to generate a survey.

In another embodiment, a survey presented to a user may include a generic portion that is presented to every user that receives a survey as well as a personal portion that includes content specifically generated in response to monitoring a communication session between the user and a Contact Center resource (e.g., agent). The personal portion may be presented before or after the generic portion.

In another embodiment, a survey may be generated based on multiple calls by a party to a contact center. In one embodiment, this can be based on a prematurely dropped call.

DETAILED DESCRIPTION

Figure 1:
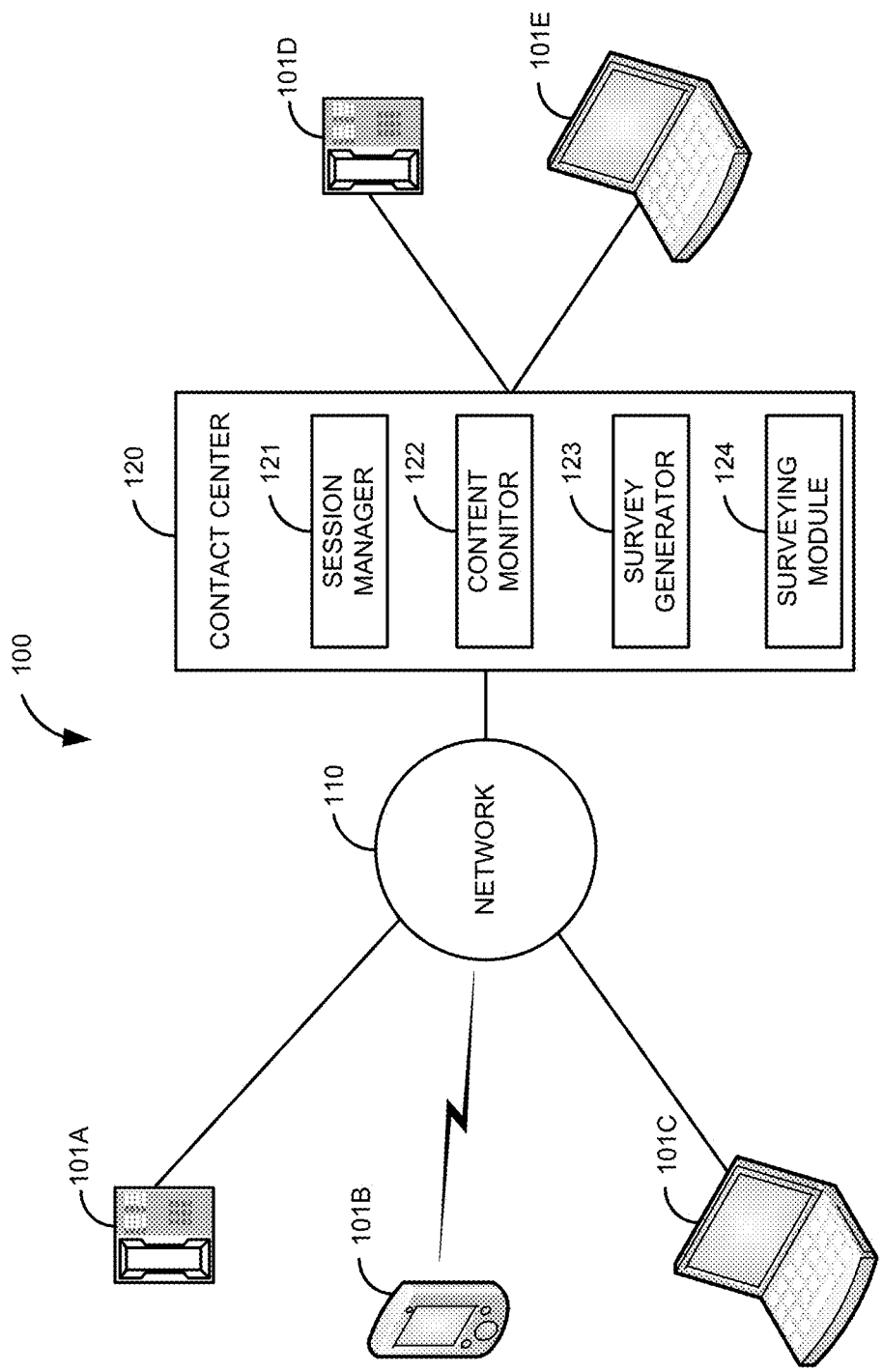
FIG. 1 is a block diagram of a first illustrative system for generating a survey based on content of a communication session.

FIG. 1 is a block diagram of a first illustrative system 100 for generating a survey based on content of a communication session. The first illustrative system 100 comprises communication endpoints 101A-101E, a network 110, a contact center 120, a session manager 121, a content monitor 122, a survey generator 123, and a surveying module 124.

The communication endpoints 101A-101E can be or may include be any communication endpoint 101 that can communicate on the network 110, such as a Personal Computer (PC), a telephone, a video phone, a cellular telephone, a Personal Digital Assistant (PDA), a tablet device, a notebook device, a smart phone, and the like. FIG. 1 shows five communication endpoints 101A-101E. However, any number of communication endpoints 101 may be connected to the network 110 and the contact center 120, including only a single communication endpoint 101 being connected to the network 110 and a single communication endpoint 101 being connected to the contact center 120.

The network 110 can be or may include any network 110 that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), H.323, video protocols, email protocols, text messaging protocols, Instant Messaging protocols, Integrated Services Digital Network (ISDN), and the like.

The contact center 120 can be or may include any system that handles contacts from customers, such as a call center. The contact center 120 can handle a variety of communications, such as voice communication sessions and video communication sessions.

The session manager 121 can be or may include any hardware/software that can handle communication sessions, such as a Private Branch Exchange (PBX), a central office switch, a Session Initiation Protocol (SIP) switch, a router, a proxy server, and/or the like. The session manager 121 is shown in the contact center 120. However, in other embodiments, the session manager 121 may be distributed in the network 110 or within the communication endpoints 101A-101E.

The content monitor 122 can be or may include any hardware/software that can monitor content of a communication session. The content monitor 122 can monitor in real time, content of communication sessions, such as content in a video communication session and content in a voice communication session.

The survey generator 123 can be or may include any hardware/software that can create, modify, and/or generate a survey. The surveying module 124 can be or may include any hardware/software that can manage surveys.

In FIG. 1, the session manager 121, the content monitor 122, the survey generator 123, and the surveying module 124 are shown within contact center 120. However, in other embodiments, individual elements 121-124 can all be separate from the contact center 120.

A communication session is established by the session manager 121 between the communication endpoint 101A and the communication endpoint 101D. The communication session can be a voice communication session or a video communication session. The communication session may be initiated from the communication endpoint 101A. Alternatively, the communication session may be initiated from the communication endpoint 101D. The communication session can be initiated via an auto-dialer in the contact center 120 (not shown). Although the communication session is described as being from the communication endpoint 101A to the communication endpoint 101D, the communication session can be from or to any of the communication endpoints 101A-101E.

In one configuration, the communication session is between a user at the communication endpoint 101A and a contact center agent at the communication endpoint 101D. A contact center agent can be a human agent, an agent supervisor, a subject matter expert, and/or the like. However, other embodiments may not involve the contact center 120 or contact center agents. In another embodiment a user may be an automated agent, such as an IVR system.

The content monitor 122 monitors content of the communication session to identify one or more topics in the communication session. The content monitor 122 can monitor the communication session by looking for specific words, phrases, gestures, punctuation, key presses, abbreviations, and/or the like to identify topics. The content monitor 122 can monitor content in various types of media, such as voice media or video media. A topic can be any type of topic that can be uniquely identified. For example, a topic could be that a user wanted to purchase product X, but that product X was out of stock. A second topic could be that an agent recommended product Y as a replacement for product X, which the user purchased.

The survey generator 123 generates a survey by incorporating the one or more topics into the survey. For example, using the above identified topics, a survey can be generated that contains the following questions:

1) Were you upset that product X was out of stock?
2) Are you satisfied with the purchase of product Y in place of product X?
3) How would you rate your overall experience?

In this example, questions 1 and 2 were generated dynamically based on topics that were discussed in the communication session. Question 3 is a generic predefined question that is not based on a topic that occurred in the communication session. The generated survey can contain topics that were discussed as part of the communication session and/or topics that were not discussed during the communication session. The topic can be incorporated into the survey in various ways. For instance, the topic can be in the form of a question, in the form of a statement, in the form of a reference (i.e., a link), and/or the like. The generated survey may present questions regarding the topics to a user in parallel as shown above. In addition, the topics can be presented to the user in a serial manner or based on a hierarchy or a combination of these. The dynamically generated questions can be arranged in any manner with the predefined questions.

In one embodiment, a topic can be generated based on a non-response. For example, as part of a communication session, the user is asked by an IVR system to give a response to a question. If the user did not respond, an identified topic could be to ask the user why he/she did not respond to the question.

The surveying module 124 sends or presents the survey to a user of the communication endpoint 101A. For example, the surveying module 124 could send the survey via email, present the survey via an IVR system, send a link to a web page, and/or the like. The user of the communication endpoint 101A is then able to complete the survey. This allows better feedback than the case where more generic questions are presented to the user with existing systems.

To illustrate, consider the following example. A user initiates a video session from the communication endpoint 101B to an agent in the contact center 120 at the communication endpoint 101E. The session manager 121 establishes the video session between the communication endpoint 101B and the communication endpoint 101E. During the video session, while the content monitor 122 is monitoring the video session, the user indicates that he would like to get technical support for dealing with a problem in product Z. The agent provides a first solution to solve the problem in product Z that does not work. The agent then provides a second solution that solves the user's problem. The content monitor 122 identifies three topics: 1) the user is having a problem with product Z, 2) the agent suggested a first solution that did not work, and 3) the agent suggested a second solution that solved the user's problem.

The survey generator 123 generates a survey that asks the user: 1) Do you know what caused the problem in product Z? 2) How would you rate the first solution given by the agent? and 3) How would you rate the second solution provided by the agent? The surveying module 124 sends a link of a web site for the user to take the survey.

The above process can be used in instances of where the user has a second communication session 120 with the agent. For example, using the example described above, the user at the communication endpoint 101B initiates a second video session with the agent at communication endpoint 101E. In one embodiment, the topic(s) that are identified in the second communication session are also incorporated into survey. This can be based on the content of the first and second communication session being similar. Alternatively, if the content is different, a second survey may be generated and presented or sent to the user.

In this example, the monitored content is the audio portion of the video communication session. However, in other embodiments, content from the video portion of the communication session can also be monitored to identify a topic. For example, a topic could be based on a user frowning or making a specific gesture.

In another embodiment, a second communication session can be initiated between the user and a second agent using different communication endpoints 101 using different mediums. For example, using the video example described above, after the initial video session with the first agent, a second agent at the communication endpoint 101D makes a voice call in regard to Product Z to the same user at the communication endpoint 101A (e.g., the user's home phone instead of the user's mobile device 101B). The identified topics of the second communication session can be incorporated into the survey.

Figure 2:
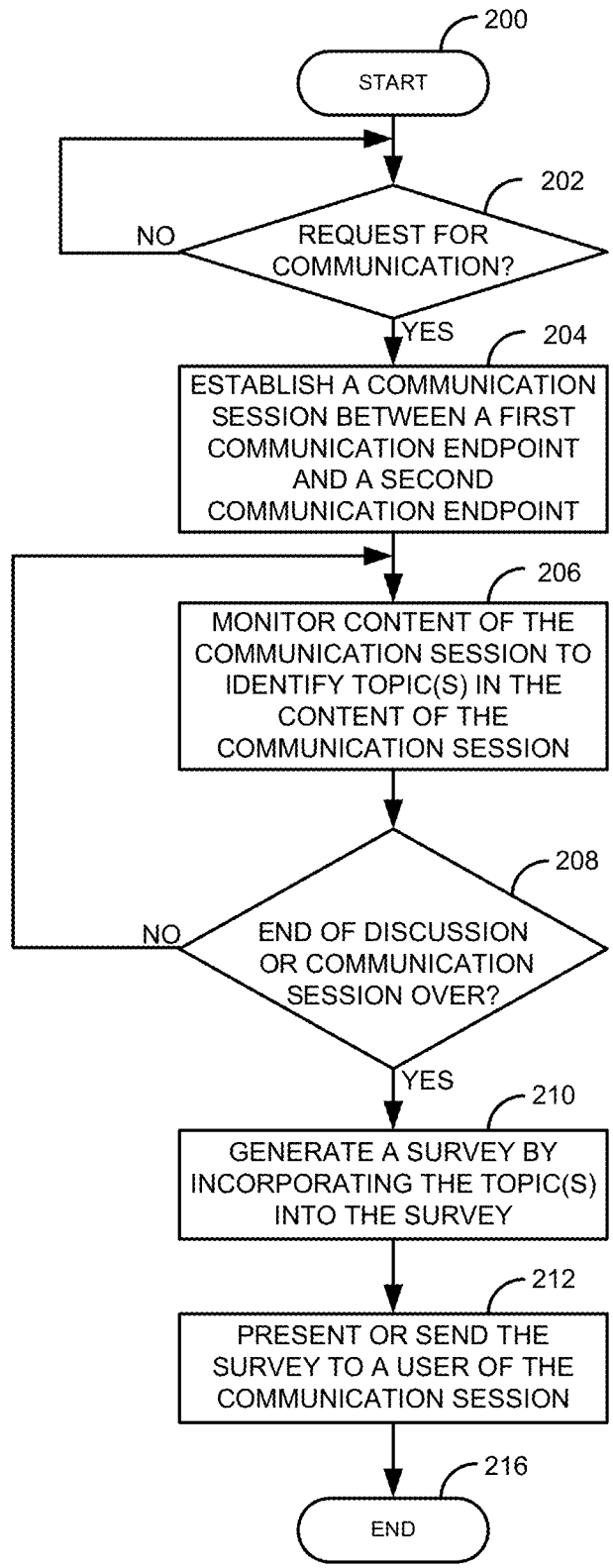
FIG. 2 is a flow diagram of a process for generating a survey based on content of a communication session.

FIG. 2 is a flow diagram of a process for generating a survey based on content of a communication session. Illustratively, the communication endpoints 101A-101E, the contact center 120, the session manager 121, the content monitor 122, the survey generator 123, and the surveying module 124 are stored-program-controlled entities, such as a computer or processor, which performs the method of FIGS. 2-7 and the processes described herein by executing program instructions stored in a tangible computer readable storage medium, such as a memory or disk. Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process starts in step 200. The process determines, in step 202 if a request to establish a communication session has been received. If a request has not been received, the process continues to wait for a request in step 202. Otherwise, if a request for a communication session has been received, the process establishes, in step 204, a communication session between a first communication endpoint and a second communication endpoint. The process of establishing a communication session, in one embodiment, is accomplished by using a different thread for each communication session. Thus, as each request for a communication is received, a new thread is executed to perform the steps 204-216.

The content of the communication session is monitored to identify one or more topics in step 206. The process determines in step 208 if the discussion has ended or if the communication session is over. A communication can be over based on various criteria, such as a user hanging up a voice or video call, a user not responding, an agent hanging up a voice or video call, and/or the like. A discussion can end based on various criteria, such as, an indication by the agent to pass the user to be surveyed by the surveying module 124, by an indication by the user that he/she is done talking with the agent, based on monitored content of the communication session, and/or the like. If the discussion has ended and the communication session is not over in step 208, the process goes back to step 206 to monitor the content of the communication session. If the discussion has ended or the communication session is over in step 208, the process generates a survey by incorporating the one or more topics into the survey in step 210. The survey is presented or sent to a user of the communication session in step 212. This could be the first user, the second user, or both. In one embodiment, the survey can be sent to both the first user and the second user that contains different questions. For example, the questions sent to a customer may be different than questions sent to an agent, even though the identified topic(s) are the same. The process then ends in step 216.

The above process is described where the survey is generated when the communication session is over in step 208. However, in other embodiments, the survey may be generated and/or sent based on an event that occurs during the communication session rather than at the end of the communication session. For example, the survey can be generated based on a word or phrase spoken in the communication session. Alternatively, the survey may be generated based on a transfer or conferencing of the communication session. The survey may be generated periodically based on a defined time period or based on a signal from a supervisor of an agent monitoring the communication session.

Figure 3:
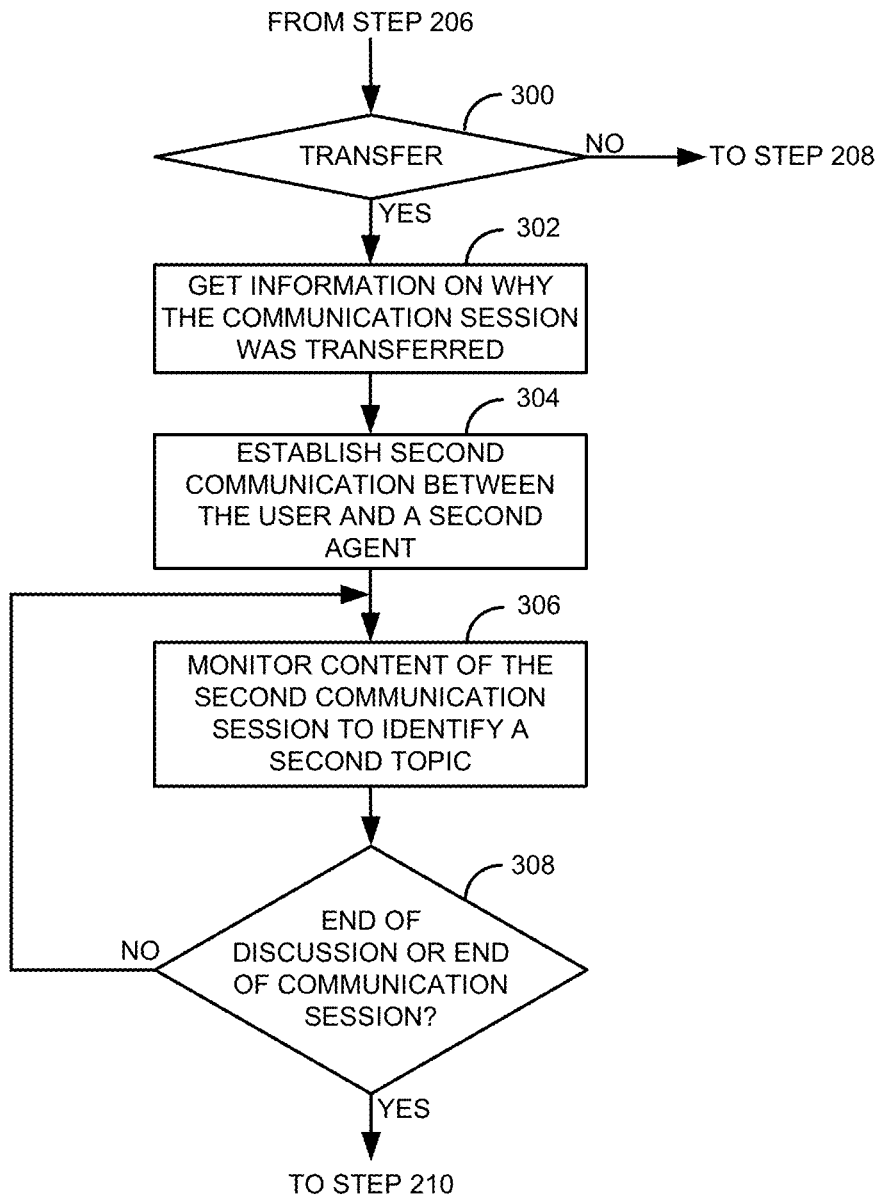
FIG. 3 is a flow diagram of a process for generating a survey based on content of a transferred communication session.

FIG. 3 is a flow diagram of a process for generating a survey based on content of a transferred communication session. After monitoring content of the communication session in step 206, the process determines, in step 300, if the communication session has been transferred. For example, in a contact center, a first agent may transfer a video communication session to a second agent or subject matter expert. If the communication session has not been transferred in step 300, the process goes to step 208.

Otherwise, if the communication session has been transferred in step 300, the process can optionally get information on why the communication session was transferred in step 302. Reasons why the communication was transferred can be based on a variety of reasons, such as, based on the topic of the communication session. For example, a voice call can be transferred to another agent better equipped to handle the communication session, based on words spoken in the communication session, and/or the like. In addition, information that is not part of the communication session that is related to the transfer may also be captured. For example, a supervisor may determine to transfer the communication session, an agent may have to leave from a shift, an agent may have to leave for a break, a note may be created by an agent after transferring the first communication session, and/or the like.

Based on the transfer, a second communication session is established between the user of the communication endpoint a second agent or user in step 304. The process monitors the content of the second communication session to identify a second topic(s) in step 306. The process determines if the discussion has ended or if the communication session has ended in step 308. If the discussion has not ended and communication session has not ended in step 308, the process goes back to step 306. Otherwise, if the discussion has ended or the communication session has ended in step 308, the process goes to step 210. In step 210, the one or ore topics identified for the first communication session and the second topic(s) identified in the second communication session are incorporated into the survey. For example, if service A was discussed in the first communication session and product Y was discussed in the second communication session, both topics may be incorporated into the generated survey.

The above process can be used for any of the communication endpoints in the communication session. For example, the above process could relate to a communication session that is transferred by a customer who called into a contact center.

Figure 4:
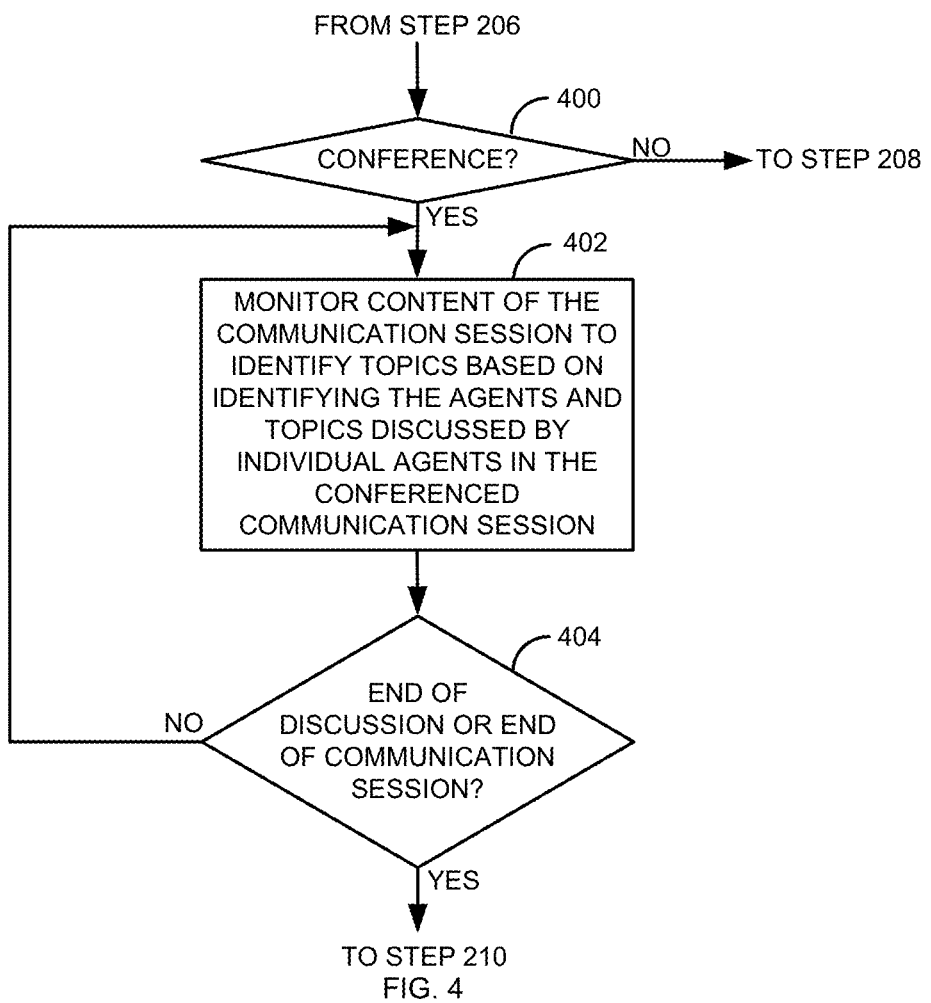
FIG. 4 is a flow diagram of a process for generating a survey based on content of a conferenced communication session.

FIG. 4 is a flow diagram of a process for generating a survey based on content of a conferenced communication session. After monitoring content of the communication session in step 206, the process determines, in step 400, if the communication session has been conferenced with another communication endpoint. The conferenced user at another communication endpoint may be an agent in a contact center, another person, and/or the like. For example, an agent may conference his/her supervisor onto the communication session. If the communication session has not been conferenced in step 400, the process goes to step 208.

Otherwise, if the communication session has been conferenced in step 400, the process monitors, in step 402, the content of the communication session to identify topics based on identifying the agents or users and topics discussed by individual agents or users in the conferenced communication session. The process determines in step 404 if the discussion has ended or if the conferenced communication session has ended. If the discussion has not ended and the conferenced communication session has not ended in step 404, the process goes back to step 402.

Otherwise, if the discussion has ended or if the communication session has ended in step 404, the process goes to step 210. In step 210, the topics are incorporated into the survey by associating the individual agents or users based on topics associated (i.e., discussed) with the individual agents (or users). For example, if agent A discussed product A with the user and agent B discussed product B with the user in the conferenced communication session, the generated survey could include the following dynamically generated questions: 1) How would you rate Agent A's knowledge of product A? and 2) How would you rate Agent B's knowledge of product B?

The above process can also be used to monitor the content of the communication session if the communication session is eventually transferred to the communication endpoint that was conferenced in. In addition, the above process can be used for any of the communication endpoints used in the communication session. For example, the above process could relate to a communication session that is conferenced by a customer who called into a contact center. In addition, the topics can be associated with individual users even if the call was not conferenced.

Figure 5:
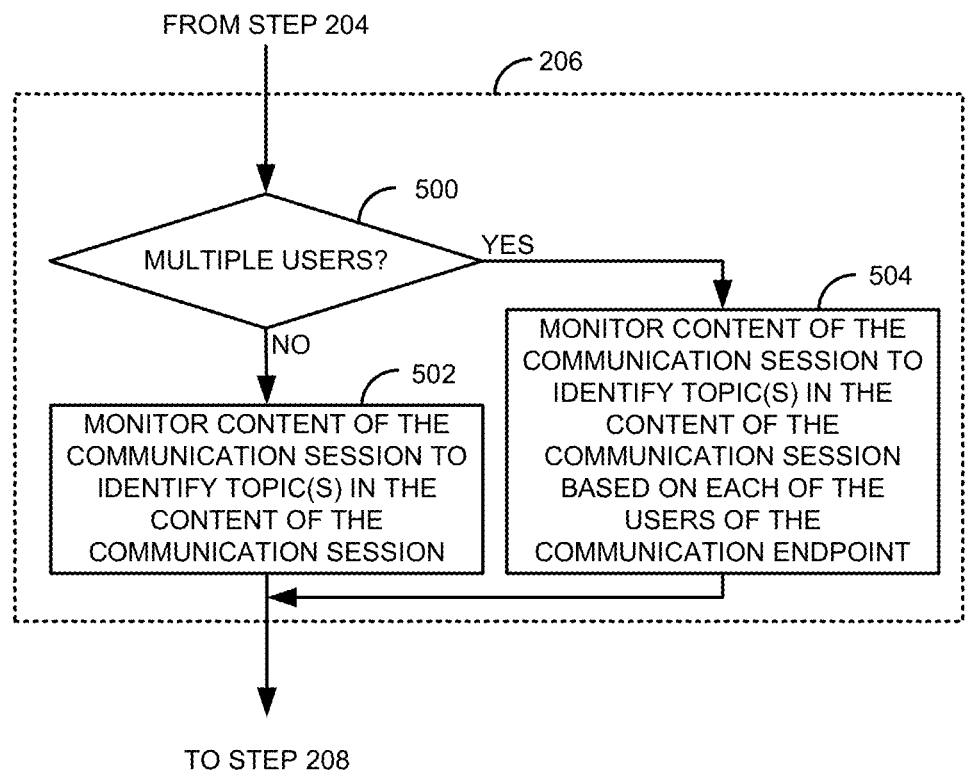
FIG. 5 is a flow diagram of a process for generating a survey based on a multi-user communication session.

FIG. 5 is a flow diagram of a process for generating a survey based on a multi-user communication session. A multi-user communication is a communication session of where one or more of the communication endpoints on the communication session have multiple users (e.g., multiple users in a conference room). Another example would be where multiple customers from a single communication endpoint can call into a contact center to discuss a product with an agent. FIG. 5 is an exemplary embodiment of step 206 in FIG. 2.

After the communication session has been established in step 204, the process determines, in step 500, if one or more of the communication endpoints have multiple users. Any communication endpoint in the communication session may have multiple users. For example, an agent communication endpoint can use a speakerphone to conference multiple agents into the communication session. If one or more of the communication endpoints does not have multiple users, the process monitors, in step 502, the content of the communication session to identify topics in the content of the communication session. The process then goes to step 208.

Otherwise, if the process determines in step 500 that one or more of the communication endpoints does have multiple users, the process monitors content of the communication session, in step 504, to identify topics in the content of the communication session based on each of the users at the communication endpoint that has multiple users. The process then goes to step 208. When the survey is eventually generated in step 210, the topics associated with individual users can be associated with any topic discussed by the individual users. For example, if a first user of a first communication endpoint discussed topic A and a second user of the first communication endpoint discussed topic B, the generated survey may contain the following dynamically generated questions: 1) User A, what was the reason you brought up topic A? and 2) User B, what was the reasons you brought up topic B? In another embodiment, a separate survey may be generated for both the first and second user based on the topics that they each discussed individually.

The above process can identify each user using various criteria, such as voice recognition, facial recognition, caller ID, by asking a user to identify who they are, and/or the like. Once a user is identified, any spoken or video content can be associated with the identified user.

The above process can also be used for an individual user of each communication endpoint where the endpoint only has a single user. For example, if a first user at a first communication endpoint brought up topic A and a second user at a second communication endpoint brought up topic B, each user can be associated with the topic that was brought up by the respective user.

Figure 6:
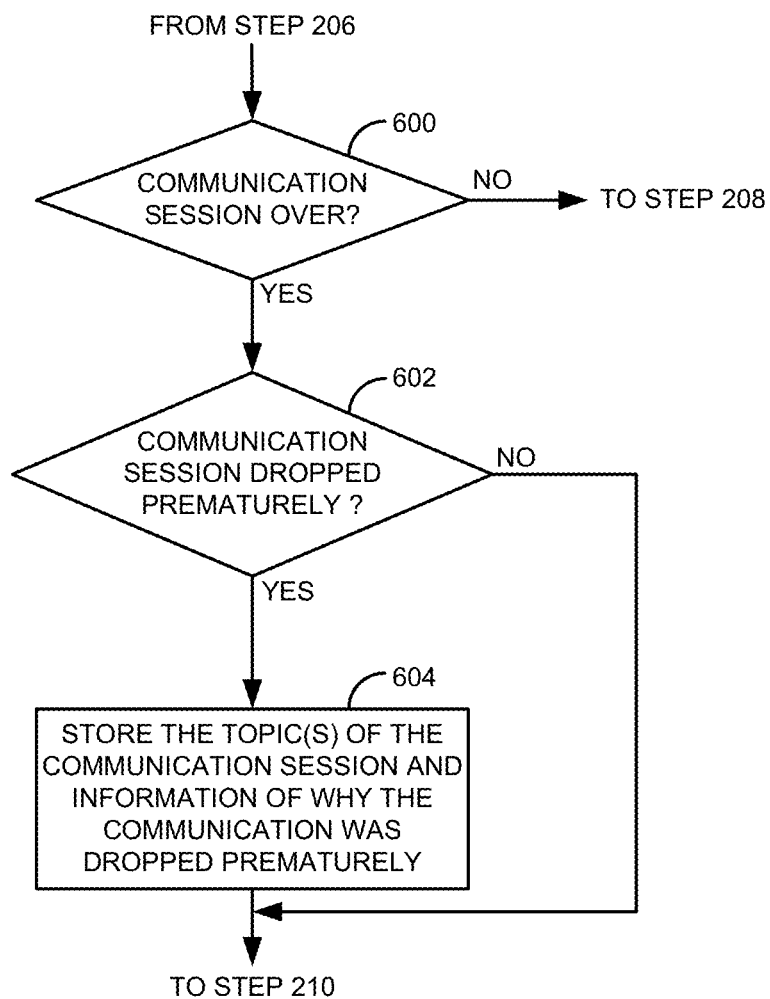
FIG. 6 is a flow diagram of a process for storing topics and information regarding a prematurely dropped communication session.

FIG. 6 is a flow diagram of a process for storing topics and information regarding a prematurely dropped communication session. After monitoring the content of communication session to identify topics in the communication session in step 206, the process determines in step 600 if the communication session is over. If the communication session is not over in step 600, the process goes to step 208. Otherwise, if the communication session is over in step 600, the process determines in step 602 if the communication session was dropped prematurely.

A communication session can be dropped prematurely for various reasons. For example a dropped communication session can be caused by a connection failure in a contact center, a disconnection by an agent in the contact center (e.g., before the customers issue was resolved), a loss of a cell signal of a communication endpoint, a disconnection by the user (e.g., the user disconnected while waiting to be connected to an agent), an incorrect transfer attempt by the agent in the contact center, dropping a caller while attempting placing the caller on hold, the caller is disconnected before being given the survey, and/or the like. The reason of why the communication session was dropped prematurely may or may not be based on the monitored content.

If the communication session was not dropped prematurely, the process goes to step 210. Otherwise, if the call was dropped prematurely, the process stores the topics of the communication session and/or information of why the communication session was dropped prematurely in step 604. The information can be stored in a memory. The process goes to step 210.

Figure 7:
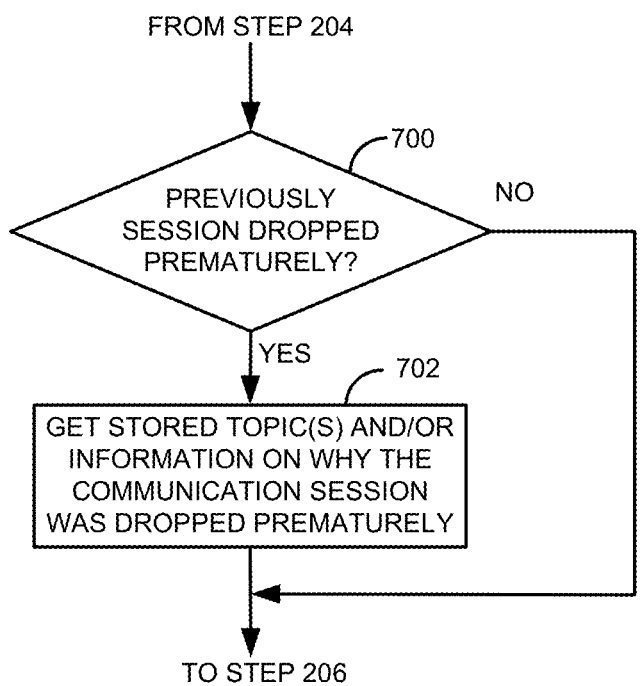
FIG. 7 is a flow diagram of a process for generating a survey using stored topics and information from a prematurely dropped communication session.

FIG. 7 is a flow diagram of a process for generating a survey using stored topics and information from a prematurely dropped communication session. After establishing the communication session in step 204, the process determines, in step 700, if this communication session is based on a previous communication session that was dropped prematurely. The determination is typically made based on the same caller calling back. However, other factors may be used, such as the call being from the same user within a defined period of time, the call is made to the same user, based on an incomplete call resolution (e.g., a customers problem was not addressed by an agent in a contact center and the agent has indicated that he will call the customer back), based on monitored content of the communication session (when the same caller calls back), and/or the like.

If the communication session was not dropped prematurely in step 700, the process goes to step 206. Otherwise, if the process was dropped prematurely in step 700, the process gets the stored topics and/or information on why the communication session was dropped prematurely (the information stored in step 604 of FIG. 6) in step 702. The process then goes to step 206. When the survey is generated in step 210, the process can use the stored topics and information on why the communication session was dropped prematurely by incorporating it into the survey in any of the manners described above.

In the examples discussed above, the survey is sent to the customer at the end of the communication session. However, in other embodiments, the survey can be stored in a database. The survey could then be given to the user at a later point in time, such as when the user calls in a second time. The survey can incorporate the subject of each of the calls.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
monitoring, with a processor, content of a first communication session between a first communication endpoint of a first user and a second communication endpoint of a second user to identify specific words or gestures in the content of the first communication session;
generating, with the processor, a first survey that includes a dynamically-generated question based on the identified specific words or gestures; and
presenting or sending, with the processor, the first survey to the first user of the first communication endpoint after the first communication session is completed.

2. The method of claim 1, further comprising monitoring, with the processor, a second communication session to identify additional words or gestures in content of the second communication session, wherein the additional words or gestures are incorporated into the first survey as a second dynamically-generated question included in the first survey prior to presenting the first survey to the first user.

3. The method of claim 1, wherein the dynamically-generated question is generated to contain words identified by the monitoring, and the dynamically-generated question is not selected from a previously drafted question.

4. The method of claim 1, wherein a second survey is presented or sent to a different user than the first user, wherein the second survey comprises a second dynamically-generated question that is based on the identified specific words or gestures, and wherein the second dynamically-generated question is different than the dynamically-generated question.

5. The method of claim 1, further comprising:
monitoring, with the processor, content of a second communication session with the first user after the first communication session ended, wherein the monitoring the content of the second communication session is based on identifying, with the processor, that the specific words or gestures are discussed during the second communication session wherein the first survey further includes a dynamically-generated question based on the discussion of the specific words or gestures during the second communication session.

6. The method of claim 1, further comprising:
detecting, with the processor, a conferenced third communication endpoint in the first communication session, wherein the dynamically-generated question is generated based on the detection of the conferenced third communication endpoint.

7. The method of claim 1, wherein the first communication session is transferred, wherein additional words or gestures are discussed with the first user after the transfer, and wherein the first survey includes the additional words or gestures.

8. The method of claim 1, further comprising:
detecting, with the processor, a non-response of the first user during the first communication session, wherein the dynamically-generated question is generated based on the detection of the non-response.

9. The method of claim 1 further comprising:
monitoring, with the processor and after the first communication session has ended, content of a second communication session of the first user;
identifying additional words or gestures in the content of the second communication session; and
incorporating, with the processor, the additional words or gestures into the first survey in a same dynamically-generated question with the specific words or gestures.

10. The method of claim 1, wherein the first communication session is prematurely disconnected and further comprising:
monitoring, with the processor, content of a second communication session including the first user that occurs after the premature disconnection;
identifying additional words or gestures that are related to the premature disconnection; and
incorporating, with the processor, the additional words or gestures into the first survey.

11. The method of claim 1, wherein the dynamically-generated question is generated using words identified by the monitoring of the content.

12. A system, comprising:
a content monitor of a contact center that, when executed by a first processor, monitors content of a first communication session between a first communication endpoint of a first user and a second communication endpoint of a second user to identify specific words or gestures in the content of the first communication session;
a survey generator of the contact center that, when executed by a second processor, generates a first survey that includes a dynamically-generated question based on the identified specific words or gestures; and
a surveying module of the contact center that, when executed by a third processor, presents or sends the first survey to the first user of the first communication endpoint after the first communication session is completed.

13. The system of claim 12 wherein:
the content monitor, when executed by the first processor, monitors content of a second communication session to identify additional words or gestures, the second communication session corresponding to a communication session established in response to the first communication session; and
the survey generator, when executed by the second processor, determines whether to incorporate the additional words or gestures into the first survey based on a comparison between the specific words or gestures and the additional words or gestures, and
incorporating the additional words or gestures into the first survey as a second dynamically-generated question based on the comparison.

14. The system of claim 12:
wherein the content monitor, when executed by the first processor, monitors content of a second communication session, the second communication session corresponding to a communication session established in response to the first communication session being at least one of transferred or conferenced; and
wherein the survey generator, when executed by the second processor, incorporates information of why the second communication session was established by dynamically-generating a second dynamically-generated question related to why the second communication session was established.

15. The system of claim 12 wherein:
the content monitor, when executed by the first processor, detects a conferenced third communication endpoint in the first communication session, identifies that the specific words or gestures was discussed with the second user at the second communication endpoint and was additional words or gestures were discussed at the conferenced third communication endpoint; and
the survey generator, when executed by the second processor, incorporates the specific words or gestures into the first survey based on the conference and incorporates the additional words or gestures into the first survey.

16. The system of claim 15, wherein the survey generator incorporates the additional words or gestures into the first survey as a second dynamically-generated question based on the conference.

17. The system of claim 12, wherein the first communication endpoint is a communication endpoint of a plurality of users comprising the first user and a third user, and wherein:
the content monitor, when executed by the first processor, identifies that the first communication endpoint is a multi-user communication endpoint and based on the identification of the multi-user communication endpoint, identifies the first user and the third user of the first communication endpoint in the first communication session and identifies that the specific words or gestures is associated with the first user and additional words or gestures are associated with the third user at the first communication endpoint;
the survey generator, when executed by the second processor, incorporates the specific words or gestures into the first survey and incorporates the additional words or gestures into a second survey by including a second dynamically-generated question based on the additional words or gestures; and
the surveying module, when executed by the third processor, presents or sends the second survey to the third user.

18. The system of claim 12 wherein:
the content monitor, when executed by the first processor, detects at least one of a call conferencing and a call transfer involving the first user; and
the survey generator, when executed by the second processor, determines the dynamically-generated question based on the detection of the at least one of the call conferencing and the call transfer.

19. The system of claim 12, wherein the first communication session is prematurely disconnected and wherein:
the content monitor, when executed by the first processor, monitors content of a second communication session including the first user to identify a content of the dynamically-generated question; and
the survey generator, when executed by the second processor, incorporates information of why the first communication session was prematurely disconnected into the first survey as a second dynamically-generated question.

20. A contact center, comprising:
a content manager comprising a first processor and a first computer-readable memory, the first computer-readable memory having stored thereon instructions that, when executed, cause the first processor to:
monitor content of a first communication session between a first communication endpoint of a first user and a second communication endpoint of a second user to identify specific words or gestures in the content of the first communication session;
a survey generator comprising a second processor and a second computer-readable memory, the second computer-readable memory having stored thereon instructions that, when executed, cause the second processor to generate a first survey that includes a dynamically generated question based on the identified specific words or gestures; and
a surveying module comprising a third processor and a third computer-readable memory, the third computer-readable memory having stored thereon instructions that, when executed, cause the third processor to present or send the first survey to the first user of the first communication endpoint after the first communication session is completed.

* * * * *